United States Patent
Schneider et al.

(10) Patent No.: US 10,481,356 B2
(45) Date of Patent: Nov. 19, 2019

(54) SUBMARINE COMMUNICATIONS CABLE, AND METHOD AND DEVICE FOR THE PRODUCTION THEREOF

(71) Applicant: Norddeutsche Seekabelwerke GmbH, Nordenham (DE)

(72) Inventors: Patrick Schneider, Nordenham (DE); Roland Grabhorn, Stadland (DE)

(73) Assignee: Norddeutsche Seekabelwerke GmbH, Nordenham (DE)

( * ) Notice: Subject to any disclaimer, the term of this patent is extended or adjusted under 35 U.S.C. 154(b) by 0 days.

(21) Appl. No.: 16/081,120

(22) PCT Filed: Feb. 24, 2017

(86) PCT No.: PCT/EP2017/000259
§ 371 (c)(1),
(2) Date: Aug. 30, 2018

(87) PCT Pub. No.: WO2017/148578
PCT Pub. Date: Sep. 8, 2017

(65) Prior Publication Data
US 2019/0086624 A1    Mar. 21, 2019

(30) Foreign Application Priority Data
Apr. 29, 2016 (DE) .................. 10 2016 005 524

(51) Int. Cl.
*G02B 6/44* (2006.01)
(52) U.S. Cl.
CPC ......... *G02B 6/4427* (2013.01); *G02B 6/4432* (2013.01); *G02B 6/4488* (2013.01); *G02B 6/442* (2013.01)
(58) Field of Classification Search
CPC ... G02B 6/4427; G02B 6/4432; G02B 6/4488
See application file for complete search history.

(56) References Cited

U.S. PATENT DOCUMENTS

| 4,487,641 A | 12/1984 | Bohannon |
| 2011/0075979 A1* | 3/2011 | Ma .................. G02B 6/4427 385/107 |

(Continued)

FOREIGN PATENT DOCUMENTS

| DE | 3118172 A1 | 11/1982 |
| DE | 3823965 C2 | 12/1990 |

(Continued)

OTHER PUBLICATIONS

Deutsches Patent—Und Markenamt (Germany Patent and Trademark Office), Recherchenbericht (search in a related application, Jan. 23, 2017.

(Continued)

*Primary Examiner* — Sung H Pak
(74) *Attorney, Agent, or Firm* — Laurence P. Colton; Smith Tempel Blaha LLC

(57) ABSTRACT

In submarine communications cables having a copper tube surrounding optical conductors, an armoring that surrounds the tube and is made of braided strands, a jacket layer made for example of a copper tube and external insulation, the jacket layer of copper or copper tube is complicated and expensive to produce and the copper jacket layer impairs the flexibility of the submarine communications cable. The invention provides for the copper jacket layer around the strands of the armoring to be replaced by a wrapped layer formed by at least one thin, flexible band that can be easily wrapped like a tape around the strands of the armoring, and the wrapped layer formed from the at least one thin, flexible band increases the flexibility of the submarine communications cable.

18 Claims, 4 Drawing Sheets

(56) References Cited

U.S. PATENT DOCUMENTS

2011/0243515 A1 10/2011 Bradley
2013/0170800 A1 7/2013 Consonni

FOREIGN PATENT DOCUMENTS

| EP | 0417784 A2 | 3/1991 |
| GB | 1544690 A | 4/1979 |
| GB | 2051398 A | 1/1981 |
| GB | 2107896 A | 5/1983 |
| GB | 2321973 A | 8/1998 |
| WO | 2007022117 A2 | 2/2007 |

OTHER PUBLICATIONS

WIPO, International Search Report (search in a related application), dated May 10, 2017.

* cited by examiner

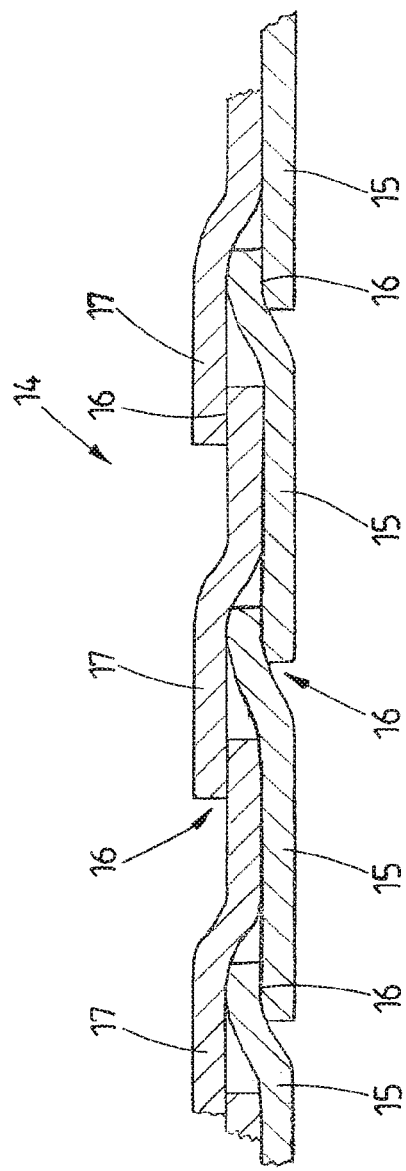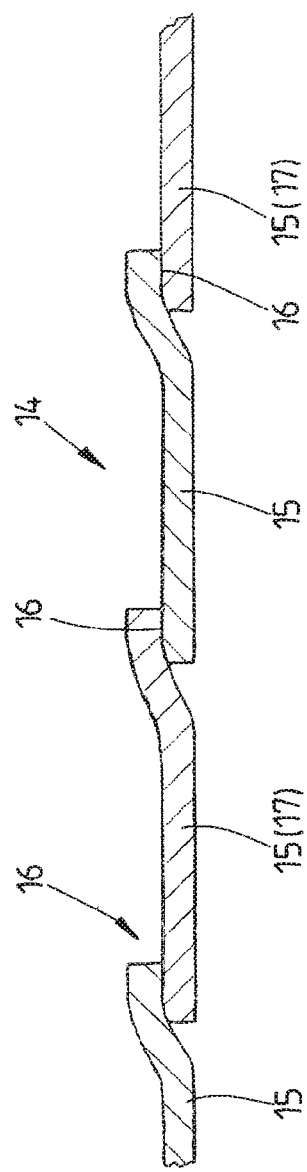

SUBMARINE COMMUNICATIONS CABLE, AND METHOD AND DEVICE FOR THE PRODUCTION THEREOF

CROSS REFERENCE TO RELATED APPLICATIONS

The application is the U.S. PCT National Phase of International Application No. PCT/EP2017/000259 having an International Filing Date of 24 Feb. 2017, which claims priority on German Patent Application No. 10 2016 002 476.3 having a filing date of 3 Mar. 2016 and German Patent Application No. 10 2016 005 524.3 having a filing date of 29 Apr. 2016.

BACKGROUND OF THE INVENTION

Technical Field

The invention relates to a submarine communications cable having optical conductors surrounded by an electrically conductive tube, an armoring which surrounds the tube externally and which is surrounded by a jacket layer, and an external insulation. Furthermore, the invention relates to a method for the production of a submarine communications cable, wherein a tube with optical conductors arranged in its interior is provided with an outer armoring and with a jacket layer and an external insulation being applied around the armoring, as well as to a device for the production of a submarine communications cable, having an apparatus for the formation of a tube which surrounds optical conductors, an apparatus for the stranded application, if necessary, of an armoring to the tube, an apparatus for the production of a jacket layer which encloses the armoring, and an apparatus for generating an external insulation.

Prior Art

Submarine communications cables have a core comprising optical fibers surrounded by a copper tube. In order to increase its tensile and compressive strength, this tube is surrounded by an armoring which, for example, is formed from stranded steel wires. The armoring is held together by a wrapping, for example a jacket layer, which in the case of known submarine communications cables is formed from a copper tube. The latter serves at the same time as an electrical conductor. Finally, this external copper tube is surrounded by an external insulation.

One significant disadvantage of the submarine communications cable described above is posed by the copper tube of the jacket layer which surrounds the armoring made of steel wires. The production of the copper tube and also the embedding of the cable core in the surrounding steel wires of the armoring is a very complicated process. In addition, the material costs of the outer copper tube make submarine communications cables more expensive. Finally, the outer copper tube reduces the flexibility of the known submarine communications cable.

BRIEF SUMMARY OF THE INVENTION

The invention is based on the object of providing a relatively inexpensive submarine communications cable, and a method and device for the simple and cost-efficient production of same.

A submarine communications cable for achieving the object stated above is a submarine communications cable having optical conductors surrounded by an electrically conductive tube, an armoring which surrounds the tube externally and which is surrounded by a jacket layer, and an external insulation, characterized in that the jacket layer is formed by at least one wrapped layer. Accordingly, the jacket layer is formed by a wrapped layer. Such a wrapped layer can be easily made of inexpensive material, for example plastic, rubber or some other type of elastomer. As a result, the cost-intensive copper tube surrounding this layer can be dispensed with and replaced by a more economical material. The wrapped layer comprising at least one thin band also enhances the flexibility of the submarine communications cable.

It is preferably provided that the wrapped layer is formed by at least one thin, flexible and/or elastic strip-like and/or flat band. Such a band can be easily wrapped like a tape around the armoring in order to stabilize the latter before the external insulation layer is applied. Serving as an electrical conductor are at least primarily the tube, which surrounds the optic fibers and comprises an electrical conductive material, preferably copper, and/or conductive strands of the armoring.

According to a preferred embodiment of the submarine communications cable, it is provided that at least one thin strip-like and/or flat band is formed by at least a slightly conductive, in particular semiconducting, material. This can preferably be a plastic or comparable material, such as rubber or an elastomer, that has been made semi-conductive. Due to the at least one conductive band, the wrapped layer formed therefrom constitutes an additional conductor or an additional electronically conductive layer having a conductivity which exceeds that of the electrical insulation materials. As a result, the at least one band and the wrapped layer formed therefrom contribute to electric field equalization, preferably for the purpose of eliminating electrical point effects.

It is conceivable for the plastic or comparable material for forming the at least one band to be self-bonding. The plastic material or the like preferably has cold self-bonding properties or is provided with an adhesive coating on at least one side. On account of this, the wrapped layer arranged around the armoring forms a continuously bonded or vulcanized jacket layer, which surrounds the armoring in the manner of a tube, thus fixing and/or holding it together.

According to a preferred configuration of the at least one thin band, provision is made to form it from a material, preferably synthetic, which widens, swells and/or inflates after the wrapped layer has been applied. This ensures that preferably all cavities, in particular interstices, between the braided wires of the armoring are filled out by the material of the wrapped layer or jacket layer, respectively. In this manner, hollow spaces under the wrapped layer are avoided in which liquid might be able to collect. This aspect is particularly important in the case of submarine communications cables laid under water.

According to an advantageous further refinement of the submarine communications cable, the at least one flat and thin strip-like band is wrapped around the armoring in a helical manner. In this way, a self-contained jacket layer can be formed easily and reliably. The at least one band is preferably wrapped around the armoring with elastic pretensioning. As a result, the individual wires or strands of the armoring are held together in a particularly secure manner. Particularly with regard to the braided wires of the armoring, this prevents the wires from springing open before the external insulation is applied. In addition, due to pretensioning, the flexible elastic band can cling to the wires or strands which form the armoring, and in particular can enter the interstices between the adjacent wires or strands.

A further possible refinement of the submarine communications cable provides for forming the wrapped layer with a plurality of layers, preferably a plurality of layers wrapped around the armoring. If two or more thin, flexible bands are wrapped around the armoring in a spiral manner in a plurality of layers, a seamless wrapped layer can be formed that is particularly reliable. This wrapped layer then results in a completely closed sleeve or tubular jacket layer. In particular, the jacket layer thus formed is flexible.

In the case of an advantageously configured submarine communications cable, the armoring is formed from a plurality of tension elements arranged around the tube in a ring-like manner. The tension elements can be placed around the tube in one or more layers. The tension elements serve to absorb tractive forces exerted on the submarine communications cable in order keep such forces from being absorbed by other components of the submarine communications cable, in particular the tube and the optical conductors arranged therein. The tension elements are preferably arranged around the tube in a stranded manner. The tension elements can preferably be identical strands or wires. The strands or wires preferably have round cross-sections. But other cross-sectional forms and/or profiles are conceivable. The wires are preferably steel wires, for example those made of stainless steel. These are capable of absorbing high tractive forces. But any other profiled strands made of tensile materials, in particular high tensile materials, can be provided instead of the steel wires, for example carbon fiber or glass fiber, aluminum, copper or the like. Due to their high tensile strength and minimal elongation, strands made of high tensile glass and/or carbon fibers are considered if the armoring is supposed to be non-conductive or only slightly conductive.

A method for achieving the object set forth at the beginning is a method for producing a submarine communications cable, wherein a tube with optical conductors arranged in its interior is provided with an outer armoring and with a jacket layer and an external insulation being applied around the armoring, characterized in that the jacket layer is produced by at least one thin band being wrapped around the armoring. Accordingly, the jacket layer is produced by wrapping at least one thin and/or flexible, in particular narrow, flat band around the armoring. The band is preferably also elastically tensile and contractile. Such a jacket layer can be produced easier and less expensive than one made of copper, in particular a copper tube.

The method preferably provides that the at least one thin band is wrapped around the armoring under tension and/or when elastically stretched. This ensures a reliable fixing of the armoring. That is particularly important in the case of armorings having stranded wires. Here the at least one band, wrapped around the wires under tension and/or elastically stretched, provides for the creation of a wrapped or jacket layer that is configured in the manner of a shrink tubing and which has the characteristics of a shrink tubing. The wires or also the strands for forming the armoring are thereby compressed, thus effectively preventing them from being displaced or springing out of place.

A further possible advantageous design of the method provides for wrapping at least one strip-like thin band around the armoring in a spiral manner. This can be done according to the winding principle. The armoring of the wrapped and jacket layer, which comprises a plurality of preferably braided armoring strands, can then be formed from the at least one band immediately following the production of the armoring.

Particularly advantageous is a method that provides for the at least one band to be to be wrapped around the armoring such that marginal regions of adjacent windings and/or of bands lying on top of one another will overlap. In this manner, a closed wrapped layer and jacket layer are achieved. If, as an alternative or supplement, the overlapping marginal regions of the or each respective band automatically adhere to each other when being wrapped around the armoring, a full-surface, liquid-tight and closed wrapped layer and jacket layer are created in a particularly reliable manner in the manner of a shrink tubing.

A further possible refinement of the method provides that at the at least one band swells after the formation of the wrapped or jacket layer. The swelling action of the at least one band forming the wrapped or jacket layer is preferably first initiated when the wrapped or jacket layer formed by the at least one band has been provided with the external insulation. It is also conceivable that the swelling of the at least one band commences only when it comes into contact with liquid or moisture, or to initiate the swelling of the band by moisture. The material of the at least one swelling band is then pressed onto the armoring which it surrounds. Above all, if the armoring comprises round wires with interstices between adjacent wires, these interstices are closed, preferably completely but at least approximately, by the swelling material of the at least one band, thus preventing hollow spaces within the submarine communications cable.

A device for achieving the stated object is a device for producing a submarine communications cable, having an apparatus for the formation of a tube which surrounds optical conductors, an apparatus for the stranded application, if necessary, of an armoring to the tube, an apparatus for the production of a jacket layer which encloses the armoring, and an apparatus for generating an external insulation, characterized in that the apparatus for producing the jacket layer has at least one unwinder for accommodating a supply of a band and for the formation of the jacket layer from the band. In the case of this device, provision is made that the installation for producing the jacket or wrapped layer is equipped with at least one unwinder for a supply of a band for the formation of the jacket and wrapped layer. A flexible and/or elastic band can be continually drawn off the respective unwinder in an ongoing manner until the supply has been used up, during which time the respective jacket layer and wrapped layer surrounding the armoring can be produced "inline", so to speak, during the production of the submarine communications cable.

A further possible refinement of the device provides that the partially completed cable provided with the armoring passes through an annular supply reel, which accommodates a supply of the thin band, in the manufacturing direction. This makes it particularly easy for the band to be wrapped around the partially completed submarine communications cable as it passes through the supply reel.

The annular supply reel is preferably rotatable about a longitudinal center line coinciding with the longitudinally center axis of the cable to be manufactured as it runs in the manufacturing direction. The longitudinal center line and rotational axis of the supply reel thus lie along the longitudinal center axis of the submarine communications cable to be manufactured. When the band is drawn off, the annular supply reel can thus rotate, or preferably be rotated, about the longitudinal axis of the cable to be produced as it moves in the manufacturing direction.

It is also conceivable to provide a plurality of supply reels, preferably two parallel supply reels. In the case of two parallel supply reels, the rotational axes lying along their longitudinal center lines preferably lie on a common axis which runs transversely to the cable to be manufactured at a 90° angle. This makes it possible for two bands to drawn off the two parallel supply reels at the same time. The two bands can be simultaneously wrapped around the submarine communications cable to be manufactured, in particular around its armoring.

In a preferred embodiment of the device, the or each supply reel is assigned an oblique, preferably all-round deflection, which is firmly attached to the respective reel, for the band that is drawn off radially from the or the respective supply reel at a 90° angle to the manufacturing direction of the cable. This is preferably executed in such a manner that the or each band runs from the deflection to the armoring to be wrapped at an oblique angle to the manufacturing direction of the cable, specifically preferably downstream of the or the respective supply reel as seen in the manufacturing direction. The wrapped layer or jacket layer around the armoring can thus be produced continuously, or inline, so to speak, from the continuous bands during the ongoing production of the submarine communications cable.

For the purpose of producing the jacket layer or wrapped layer, the devices is provided only with one supply reel or, if necessary, a plurality of supply reels, each being assigned a deflection, for example an oblique, freely rotatable deflection roller, in order to produce the wrapped layer comprising at least one tape-like band of plastic or comparable material and, if required, semi-conductive plastic. The oblique positioning of the respective deflection rollers corresponds here to the wrapping or stranding angle of the at least one thin band wrapped around the armoring in a spiral manner.

BRIEF DESCRIPTION OF THE DRAWINGS

Preferred exemplary embodiments of the invention are described below in more detail on the basis of the drawing, in which:

FIG. 2 shows a greatly enlarged longitudinal section through a short segment of a wrapped layer forming a jacket layer around the armoring;

FIG. 3 shows an alternative exemplary embodiment of the jacket layer in a view analogous to FIG. 2;

DETAILED DESCRIPTION OF PREFERRED EMBODIMENTS

Figure 1:
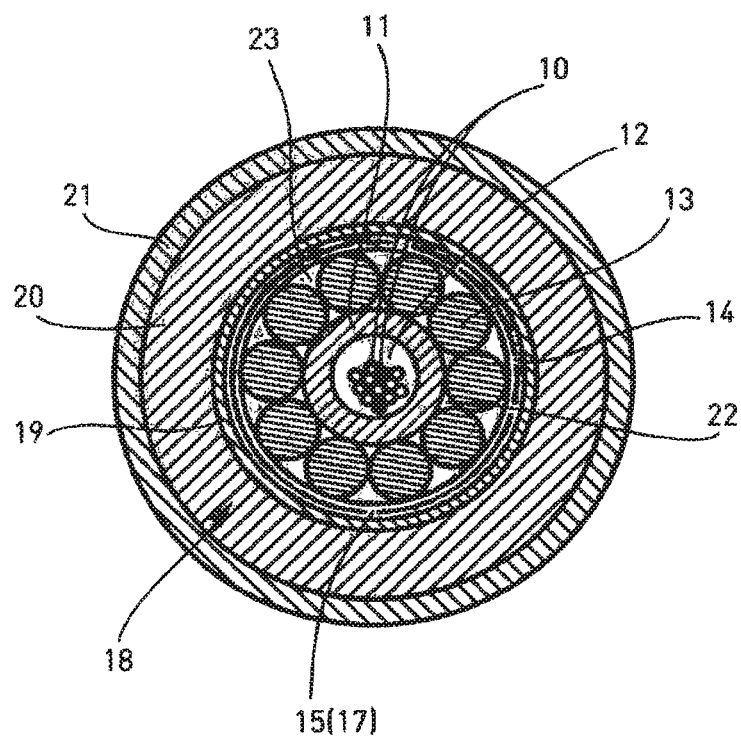
FIG. 1 shows a cross-sectional view of a submarine communications cable.

FIG. 1 shows a cross-section of a cable configured as a submarine communications cable. This submarine communications cable has a plurality of optical conductors 10 which are light-wave cables or fiber optic cables. The optical conductors 10 are accommodated in a loose or bundled manner—preferably with overlength—in an electrically conductive tube 11. In the shown submarine communications cable, which is preferably installed between amplifiers, the electrically conductive tube 11 provides the energy for the amplifier, and for this reason the shown submarine communications cable also serves as an optical submarine cable repeater. The optical conductors 10 lie either unbundled in a somewhat larger electrically conductive tube 11 or are embedded in a gel-like filling of the electrically conductive tube 11. In this case, the gel-like filling at least partially fills up the interior space 12 of the electrically conductive tube 11. The electrically conductive tube 11 is preferably made of copper, but may also be formed from a different electrically conductive material, such as aluminum. The tube 11 with the optical conductors 10 contained therein forms a core of the submarine communications cable.

The electrically conductive tube 11 is surrounded on the outside by an armoring. The armoring serves to stabilize the submarine communications cable and to protect the electrically conductive tube 11 which forms the core. For this purpose, the armoring is configured to be resistant to tensile and compressive forces. In the shown exemplary embodiment, the armoring is formed from a plurality of cylindrical strands 13 having an identical diameter between 0.1 mm and 5 mm, as well as a tensile strength of at least 500 N/mm$^2$. The strands 13 are preferably steel wires. These may be massive steel wires; but many thin steel strands can be braided to form the strand 13. The individual strands 13 are arranged to lie tightly together, in other words virtually gap-free, around the tube 11. Preferably the strands 13 are braided around the tube 11.

In the shown exemplary embodiment, the armoring surrounding the electrically conductive tube 11 is formed from only one layer of strands 13 that lie closely to one another and are preferably braided. But it is also conceivable to form the armoring from strands 13 arranged in a plurality of layers. It is also conceivable that the armoring is not formed by cylindrical strands 13, but instead by strands having a different cross-sectional shape, for example a rectangular or elliptical cross-section, or even to employ profiled strands.

The armoring is surrounded by a jacket layer. According to the invention, the jacket layer is configured as a wrapped layer 14. The wrapped layer 14 is formed from at least one thin and flexible, strip-like and/or flat band 15. Such a band 15 is flexible and thus constitutes a tape. The at least one band 15 is wrapped around the strands 13 in a helical or spiral configuration to form the jacket layer 14 surrounding the armoring. As shown in FIG. 2, the at least one band 15 can be wrapped around the armoring in a single layer, with narrow opposing marginal regions of adjacent spirals of the band 15 overlapping to form overlap areas 16. As a result, the wrapped layer 14 formed by the wound band 15 constitutes a self-contained tube around the strands 13 of the armoring. Pursuant to FIG. 3, the wrapped layer 14 has a double-layer configuration. This double wrapped layer 14 is preferably formed from the band 15 and a second band 17. The second band 17 corresponds to the first band 15 and is preferably identically dimensioned. The band 15 forms the first inner layer and the band 17 the second outer layer of the overall double wrapped layer 14.

It is also conceivable to form the single wrapped layer 14 of FIG. 2 from two bands 15 and 17. The bands 15 and 17 are then wound alternately around the armoring to lie next to each other in order to form the wrapped layer 14 such that one spiral wrap of the band 15 is followed next by a spiral wrap of the band 17, which in turn is again followed by a spiral wrap of the band 15.

The band 15 or the bands 15 and 17 are made of a thin pliable, flexible and/or elastic material which is ductile and contractible. The band 15 and/or 17 is thus realized in the manner of a tape. The material to be considered for the band 15 and/or 17 is preferably a semi-conductive, preferably slightly conductive, material, such as plastic, rubber or other elastomer. The thickness of the band 15 and/or 17 is less than 1 mm. In particular, the thickness of the band 15 and/or 17 lies in the range between 0.5 mm and 0.01 mm. Particularly preferred is a thickness ranging from 0.35 mm to 0.1 mm. The tensile strength of the band 15 and/or 17 is greater than 5 N/cm, in particular greater than 20 N/cm.

It is also conceivable for the band 15 and/or 17 to be realized as a thin fabric tape made of plastic with reinforcement fibers, in particular plastic fibers serving as the reinforcement.

In a preferred embodiment of the submarine communications cable, the wrapped layer 14 is formed from a semi-conductive band 15 and/or 17. The latter is created preferably by making the non-conductive plastic or other type of elastomer partially conductive for the formation of the band 15 and/or 17. For example, the plastic can be made conductive by the addition of carbon, which can be carbon black. The conductivity of such a band 15 and/or 17 is greater than that of electrical insulation materials.

The wrapped layer 14 of the submarine communications cable is surrounded by a preferably waterproof insulation 18. In the case of the submarine communications cable shown in FIG. 1 the insulation 18 is formed by three layers, namely an inner layer 19 surrounding the wrapped layer, an intermediate layer 20 and an outer layer 21. All three layers 19, 20 and 21 of the insulation 18 are preferably made of plastic, whereby the individual layers 19, 20 and 21 are extruded. Even if all three layers 19, 20 and 21 are made of plastic, the individual layers 19, 20 and 21 can be made of different plastics and/or plastics having different characteristics. The wall thickness of the overall insulation 18, i.e. the combined thickness of all three layers 19, 20 and 21, can widely vary according to practical requirements, ranging in particular between 0.05 mm and 10 mm. An insulation 18 comprising less than three layers is also conceivable.

In the case of the submarine communications cable shown in FIG. 1 having an armoring of cylindrical strands 13, there arises between adjacent strands 13 and the outer diameter of the tube 11 small, approximately triangular-shaped interstices 22 and between the strands 13 and the wrapped layer 14 encompassing all strands 13 somewhat larger and also triangular-shaped interstices 23. In order to avoid hollow spaces, it is provided in submarine communications cables that the interstices 22 and 23 are filled at least to a large extent. For example, the interior interstices 22 are filled by wound or continuous, swelling threads, in particular synthetic threads, when the strands 13 are placed around the tube 11. The outer interstices 23 are filled by the formation of the bands 15 and/or 17 from a swelling plastic and, if required, additional swelling strips or the like. Due to the presence of polymers in the plastic, the bands 15 and/or 17 are provided with swelling characteristics. The polymers form what is known as superabsorbent particles, which are fissured and/or porous when viewed microscopically. Since ducts are generated toward the core of the particles, which have capillary characteristics and thereby uptake moisture or fluids, the bands 15 and/or 17 thereby swell up. The swelling plastic material of the bands 15 and/or 17 results in the filling of the outer interstices 23 between adjacent strands 13 of the armoring after the wrapped layer 14 has been produced, in particular following the subsequent application of the external insulation 18.

In the overlap areas 16, the overlapping marginal regions of adjacent windings of the bands 15 and/or 17, as a result of the elastic pre-tensioning of the bands 15 and/or 17, for example, when the strands 13 of the armoring are being wrapped, are elastically pre-tensioned and pressed onto one another so firmly that the wrapped layer 14 is or becomes impervious to liquids. In principle, the wrapped layer 14 then surrounds the strands 13 of the armoring in the manner of a shrink tubing. However, it is also conceivable that at least one side of each band 15 and/or 17 is provided with an adhesive layer, with the result that the overlapping marginal regions of adjacent windings of the band 15 and/or 17 are bonded together to become liquid-tight in the overlap areas 16. As an alternative or supplementary measure, it is conceivable to provide the band 15 and/or 17 with cold self-bonding characteristics so that the overlap areas 16 of adjacent windings of the band 15 and/or 17 bond to each other automatically, particularly during the wrapping of the strands 13 under elastic pre-tensioning, or are even bonded together by vulcanization, with the overlap areas 16 between adjacent windings of the bands 15 and/or 17 becoming liquid-tight.

The wrapped layer 14 formed from flexible thin bands 15 and/or 17 thereby assumes the task of holding the strands 13 of the armoring together during the production process, which in the case of conventional submarine communications cables is assumed by the jacket layer made of copper. In addition, at least slightly conductive bands 15 and/or 17 result in electrical field-smoothing by the wrapped layer 14. The remaining functions of the copper material replaced by the bands 15 and/or 17 for the formation of the jacket layer, in particular electrical conductivity and the formation of a hydrogen barrier, is assumed by the copper tube 11 surrounding the optical conductors 10 or another conductive material. The submarine communications cable having a jacket layer formed as a wrapped layer 14 from the band 15 and/or 17 exhibits the comparable properties of a submarine communications cable having a copper jacket layer. Furthermore, the wrapped layer 14 comprising the band 15 or bands 15 and 17 is also more flexible and cost-efficient, and can be produced more easily.

FIGS. 4 to 7 present schematic representations of sections of various devices for the production of the submarine communications cable described above.

Figure 4:
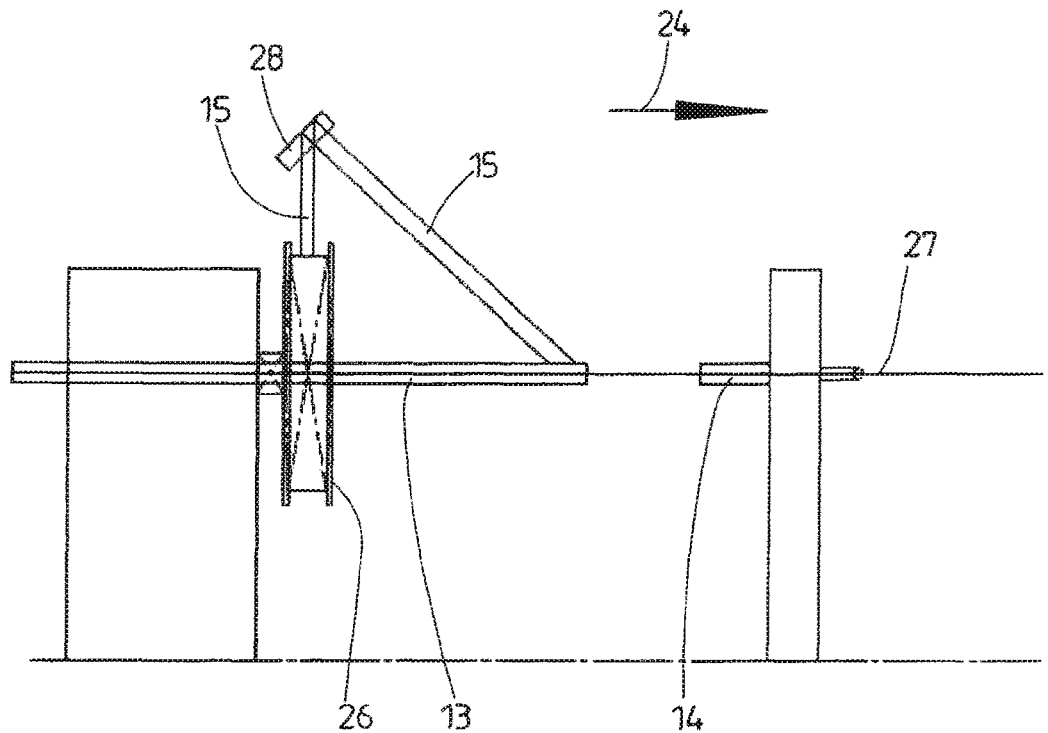
FIG. 4 shows a schematic side view of a device in the region of an installation for the production of the jacket layer which surrounds the armoring.
Figure 5:
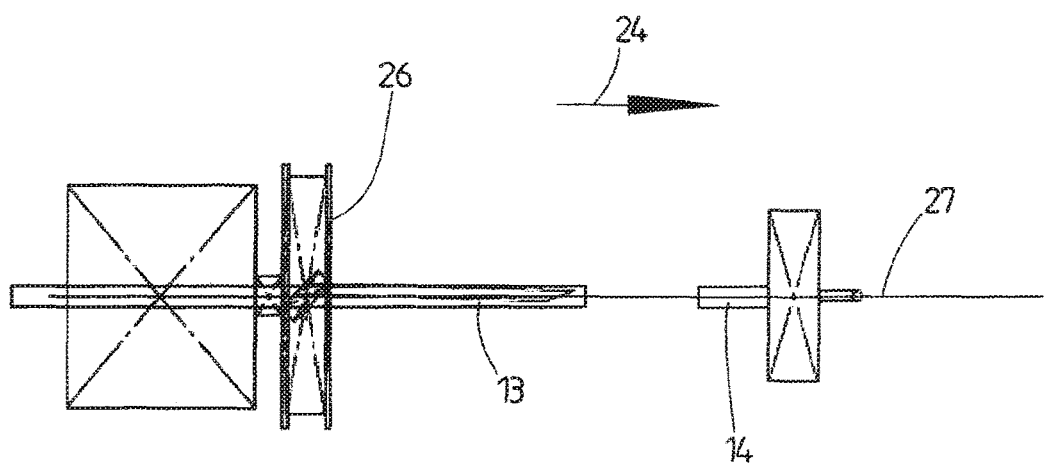
FIG. 5 shows a top view of the device of FIG. 4.

FIGS. 4 and 5 show a first exemplary embodiment of an installation for the production of the wrapped layer 14 from a single band 15. The submarine communications cable to be produced is drawn through the device in the manufacturing direction as indicated by arrow 24 as the tube 11 with the optical conductors 10, the armoring comprising the strands 13 wrapped around the tube 11, the wrapped layer 14 and the external insulation are produced step by step.

FIGS. 4 and 5 show the partially completed submarine communications cable following the completed braiding of the armoring formed from a bundle of strands 13 in a stranding machine (not shown). Following the stranding machine in the manufacturing direction 24 is a supply reel 26 of a device for producing the wrapped layer 14. The annular supply reel is arranged around the submarine communications cable to be produced such that a horizontal rotational axis of the supply reel 26 lies on a longitudinal center line 27 of the submarine communications cable to be produced. A supply of the thin, flexible band 15 is wound on the supply reel 26. Arranged next to the supply reel 26 in the radial direction is an obliquely directed deflection comprising a preferably freely rotatable roller 28. The roller 28 is connected to the supply reel 26, with the supply reel 26 and the roller 28 thereby forming a unit. The roller 28 is directed at such an oblique angle that the band 15 drawn off tangentially from the supply reel 26 is deflected at the roller 28 by 45°, for example, specifically such that it is wound around the armoring of the submarine communications cable downstream of the supply reel 26, as seen in the manufacturing direction 24, at a stranding angle of 45°. In a departure from the illustrated stranding angle of 45°, the stranding angle may also be larger or smaller, in particular in the range of 25° to 89°.

The supply reel 26 with the attached roller 28 is rotatably driven circumferentially around the longitudinal center line 27 of the submarine communications cable to be produced. The rotational speed of the supply reel 26 with the roller 28 is synchronized with the production speed of the submarine communications cable, that is to say with the feed rate of the latter in the manufacturing direction 24 as the wrapped layer 14 is applied, such that a closed wrapped layer 14 with overlap areas 16 of overlapping marginal regions of the individual windings of the band 15 pursuant to FIG. 2 is generated.

Figure 6:
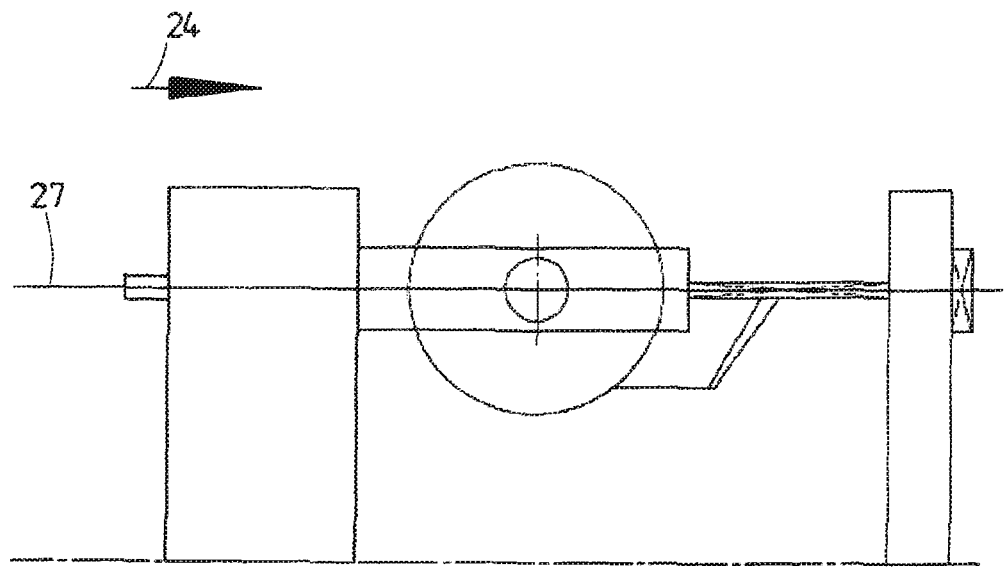
FIG. 6 shows a schematic side view of a device for the production of a jacket layer surrounding the armoring according to an alternative exemplary embodiment of the invention.
Figure 7:
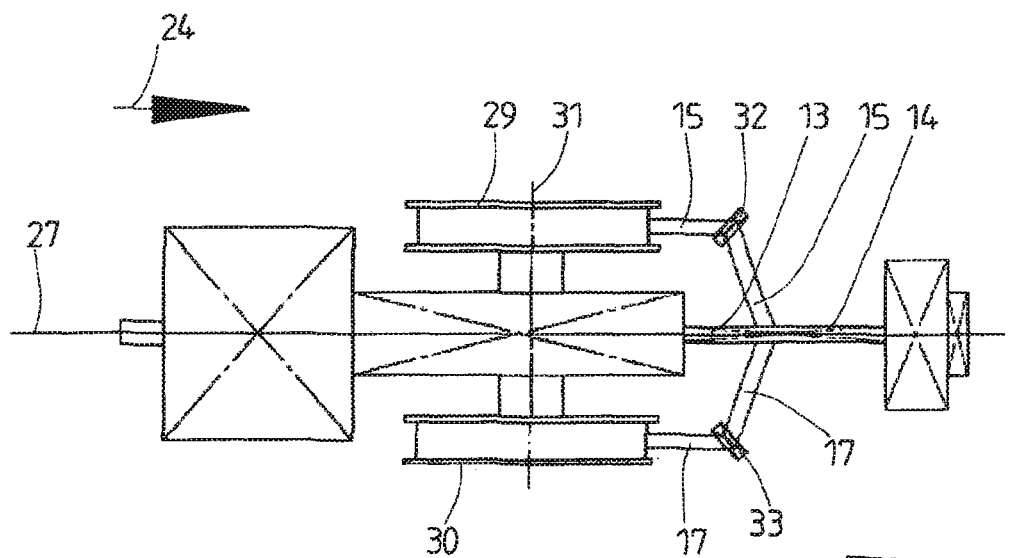
FIG. 7 shows a top view of the device of FIG. 6.

FIGS. 6 and 7 show an alternative exemplary embodiment of a device for the production of the wrapped layer 14. In this exemplary embodiment the device is provided as a tangential band unwinder with two parallel supply reels 29 and 30 of the same size. The supply reel 29 accommodates a supply of the band 15 and the supply reel 30 accommodates a supply of the preferably identical second band 17.

The supply reels 29 and 30 are arranged on opposite sides of the longitudinal center line 27 of the submarine communications cable to be produced. Here the supply reels 29 and 30 lie in two parallel lines equidistant from the longitudinal center line 27. The supply reels 29 and 30 can be rotated about a common rotational axis 31. This rotational axis 31 runs vertically through the longitudinal center line 27 of the submarine communications cable to be produced, in other words the rotational axis 31 intersects the longitudinal center line 27 at a right angle. In the shown exemplary embodiment, each supply reel 29 and 30 is assigned an obliquely directed roller 32, 33. The rollers 32, 33 of the opposite supply reels 29, 30 are inversely directed at an oblique angle, specifically such that their longitudinal center lines intersect, as seen in the manufacturing direction, upstream of the position at which the bands 15 and 17 are wrapped on the strands 13 of the armoring. The rollers 32 and 33 are also permanently attached to their respective supply reel 29 and 30.

The rollers 32 and 33 are just as freely rotatable about their longitudinal center line as the supply reels 29 and 30. The rotational axis 31 of the two supply reels 29 and 30, on the other hand, can be rotatably driven, by means of a drive unit not shown in any detail in FIGS. 6 and 7, in a plane running perpendicularly through the longitudinal center line of the submarine communications cable to be produced. As a result of the rotational axis 31 of the two supply rollers 29 and 30 rotating about the longitudinal center line 27, both bands 15 and 17 are wrapped simultaneously around the strands 13 of the armoring according to the stranding principle, thereby producing the wrapped layer 14. The bands 15 and 17 run onto the armoring at diametrically opposite positions, with the result that, in the case of a single wrapped layer 14 as shown in FIG. 2, a wrapping of the band 15 alternates with a wrapping of the band 17 to lie continuously next to one another with a slight overlapping of their marginal regions to produce the overlap areas 16.

The installation shown in FIGS. 6 and 7 with the tangential band unwinder having two supply reels 29 and 30 is also capable of a two-layered formation of the wrapped layer 14 in that a first layer of the wrapped layer 14 surrounding the strands 13 is first formed from the band 15, and subsequently this first layer of the wrapped layer 14 is wrapped by a second layer from the band 17. This then produces the double wrapped layer 14 shown in FIG. 3.

The method according to the invention for the production of the wrapped layer around the strands 13 for the formation of an armoring around the tube is explained in more detail in the following:

In the case of the method according to the invention, the jacket layer around the strands 13 is not formed by a copper layer, as was previously the case, but rather by a single or multilayer wrapped layer 14. This wrapped layer 14 is formed by at least one band 15, if necessary also by two bands 15 and 17, or even by more than two bands if required. The flexible and/or pliable bands 15 and/or 17 are made of thin, flat plastic strips. The band 15 and/or 17 is thus realized in a film-like configuration. One can therefore also refer to such a film-like band 15 and/or 17 as a "tape". Such a band 15 and/or 17 is pliable and above all very flexible. The band 15 and/or 17 is wrapped around the strands 13 of the armoring by the devices shown in FIGS. 4 to 7. This wrapping procedure of the band 15 and/or 17 around the strands 13 is executed in a helical or spiral manner in that the band 15 and/or 17 is wrapped according to the winding or stranding principle around the strands 13 at an angle of less than 90° to the longitudinal center line 27 of the submarine communications cable to be produced in order to form the armoring. This results in the single- or double-layered wrapped layer 14 shown in FIGS. 2 and 3.

The band 15 and/or 17 is preferably tightly wrapped around the armoring under tension. The wrapped layer 14 formed by the band 15 and/or 17 can thereby encompass the armoring with elastic pretensioning and therefore reliably hold the braided strands 13 of the armoring together in the manner of a shrink tubing. Furthermore, the overlapping marginal regions of adjacent windings of the band 15 and/or 17 are pressed onto each other in the overlap areas 16 due to elastic pretensioning when the bands 15 and/or 17 are wrapped around the strands 13, whereby a wrapped layer 14 is formed which is at least water-tight.

It is also conceivable that the band 15 and/or 17 is stretched in its elastic region during the wrapping of the arming and under constant pretensioning it thereby holds the strands 13 together. The elastic expansion of the band 15 and/or 17 as it is wrapped around the strands 13 can also result in the activation of specific characteristics of the bands 15 and/or 17, for example the swelling capacity of the bands 15 and/or 17. In such a case, the swelling of the bands 15, 17 does not commence until the wrapped layer 14 has been produced. As a result, it is above all possible for the outer interstices 23 between the adjacent strands 13 of the armoring to be reliably filled out by the swelling band 15 and/or 17.

It is also conceivable for the band 15 and/or 17 to acquire self-bonding, in particular cold self-bonding, properties by virtue of elastic elongation, thereby resulting in, for example, a cold bonding or a vulcanization of the overlapping marginal regions of adjacent windings of the band 15, 17 in the overlap areas 16.

The invention is not only suited for the submarine communications cable shown in FIG. 1, but also for submarine communications cables having a different structure. Furthermore, the invention is not limited to the constructive design of the submarine communications cable shown in FIG. 1.

LIST OF REFERENCES 10 optical conductor
11 tube 12 interior space
13 strand
14 wrapped layer
15 band
16 overlap area
17 band
18 insulation
19 inner layer
20 intermediate layer
21 outer layer
22 interstice
23 interstice
24 manufacturing direction
26 supply reel
27 longitudinal center line
28 roller
29 supply reel
30 supply reel
31 rotational axis
32 roller
33 roller

What is claimed is:

1. A submarine communications cable comprising:
optical conductors (10) surrounded by an electrically conductive tube (11);
an armoring which surrounds the tube (11) externally and which is surrounded by a jacket layer; and
an external insulation,
wherein the jacket layer is formed by at least one wrapped layer (14);
wherein the wrapped layer (14) is formed by at least one thin elastic strip-like band (15, 17); and
wherein the at least one thin elastic strip-like band (15, 17) is formed by at least one partially conductive material, by a partially conductive plastic material, or by a plastic material which is more conductive than one for the purpose of electric insulation.

2. The submarine communications cable as claimed in claim 1, wherein the plastic material of the at least one thin elastic strip-like band (15, 17) is self-bonding and/or cold self-bonding.

3. The submarine communications cable as claimed in claim 1, wherein the at least one thin elastic strip-like band (15, 17) is configured to widen and/or swell.

4. The submarine communications cable as claimed in claim 1, wherein the at least one thin, strip-like band (15, 17) is wrapped, or is wrapped with elastic pre-tensioning, in a helical or spiral manner around the armoring surrounding the tube (11) and/or the wrapped layer (14) is formed by a plurality of layers of bands (15, 17) wrapped around the armoring.

5. The submarine communications cable as claimed in claim 1, wherein the armoring is formed by a plurality of tensile elements, or a plurality of high-tensile strands or wires, which are arranged in a ring-like manner, or are braided, around the tube (11).

6. A method for producing a submarine communications cable, comprising:
providing a tube (11), the tube (11) having an interior with optical conductors (10) arranged in the interior of the tube (11), with an outer armoring; and
applying a jacket layer and an external insulation (18) around the armoring,
wherein the jacket layer is produced by at least one thin elastic strip-like band (15, 17) of at least one partially conductive material being wrapped around the armoring.

7. The method as claimed in claim 6, wherein the at least one thin elastic strip-like band (15, 17) is wrapped around the armoring under pre-tensioning or elastically stretching.

8. The method as claimed in claim 6, wherein the at least one thin elastic strip-like band (15, 17) is guided around the armoring in a helical or spiral manner, or wherein the at least one thin elastic strip-like band (15, 17) is guided around the armoring in a helical or spiral manner according to the winding or stranding principle.

9. The method as claimed in claim 6, wherein the at least one thin elastic strip-like band (15, 17) is wrapped around the armoring such that marginal regions of adjacent windings of the at least one band (15, 17) overlap in order to form overlap areas (16).

10. The method as claimed in claim 6, wherein a plurality of the thin elastic strip-like bands (15, 17) are wrapped simultaneously around the armoring with the same stranding angle.

11. The method as claimed in claim 6, wherein, after the formation of the wrapped layer (14) forming the jacket layer, the at least one thin elastic strip-like band (15, 17) swells.

12. The submarine communication cable as claimed in claim 1, wherein the plastic material of the at least one thin elastic strip-like band (15, 17) is provided with an adhesive coating on at least one side.

13. The method as claimed in claim 9, wherein overlapping marginal regions of the at least one thin elastic strip-like band (15, 17) form liquid-tight overlap areas (16) during wrapping around the armoring.

14. The method claimed in claim 13, wherein when the at least one thin elastic strip-like band (15, 17) is wrapped around the armoring, the marginal regions of adjacent windings of the at least one thin elastic strip-like band (15, 17) are adhesively bonded in the overlap area (16).

15. The method claimed in claim 6, wherein the at least one thin elastic strip-like band (15, 17) is wrapped around the armoring in an automatic manner.

16. The method claimed in claim 6, wherein the plurality of the thin elastic strip-like bands (15, 17) are wrapped simultaneously around the armoring with overlapping of the marginal regions of each band (15, 17).

17. The method claimed in claim 11, wherein the at least one thin elastic strip-like band (15, 17) swells such that the wrapped layer (14) first swells after it has been produced.

18. The method claimed in claim 11, wherein after the formation of the wrapped layer (14) forming the jacket layer, the at least one thin elastic strip-like band (15, 17) swells upon completion of the external insulation (18) surrounding the wrapped layer (14).

* * * * *